US012395750B1

United States Patent
Dalgleish et al.

(10) Patent No.: US 12,395,750 B1
(45) Date of Patent: Aug. 19, 2025

(54) QUANTUM-INSPIRED ADAPTIVE COMPUTATIONAL 3D IMAGER

(71) Applicants: Eagle Technology, LLC, Melbourne, FL (US); Florida Atlantic University Board of Trustees, Boca Raton, FL (US)

(72) Inventors: Fraser Dalgleish, Vero Beach, FL (US); Dennis Estrada, West Palm Beach, FL (US); Samuel H. Knarr, Melbourne, FL (US); Bing Ouyang, Vero Beach, FL (US); Oscar Lopez, Vero Beach, FL (US)

(73) Assignees: Eagle Technology, LLC, Melbourne, FL (US); Florida Atlantic University Board of Trustees, Boca Raton, FL (US)

( * ) Notice: Subject to any disclaimer, the term of this patent is extended or adjusted under 35 U.S.C. 154(b) by 0 days.

(21) Appl. No.: 18/618,351

(22) Filed: Mar. 27, 2024

(51) Int. Cl.
H04N 23/00 (2023.01)
H04N 23/95 (2023.01)

(52) U.S. Cl.
CPC .................................. *H04N 23/95* (2023.01)

(58) Field of Classification Search
CPC ....................................................... H04N 23/95
See application file for complete search history.

(56) References Cited

U.S. PATENT DOCUMENTS

| 7,884,977 B2 * | 2/2011 | Mori ...................... H04N 19/12 |
| | | 358/538 |
| 8,086,044 B2 * | 12/2011 | Feng ................... H04N 19/176 |
| | | 382/220 |

(Continued)

FOREIGN PATENT DOCUMENTS

| CN | 110579775 A | 12/2019 |
| CN | 114859378 A | 8/2022 |

OTHER PUBLICATIONS

Ming-Jie Sun, et al., "Single-pixel three-dimensional imaging with time-based depth resolution", Nature communications, Jul. 5, 2016, DOI: 10.1038/ncomms12010, 6 pages.

(Continued)

*Primary Examiner* — Frank F Huang
(74) *Attorney, Agent, or Firm* — Edell, Shapiro & Finnan, LLC

(57) ABSTRACT

A method performed by a photon imaging system comprises: selecting first patterns for illumination, and generating first illumination patterns that are time-varying responsive to the first patterns in order to illuminate a target; detecting light energy of the first illumination patterns that is reflected by the target; constructing histograms of the light energy that is detected; reconstructing an image of the target using the histograms and the first patterns; performing feedback processing of the image based on an operational objective, associated with one or more of generating illumination patterns or reconstructing the image, to produce feedback for selecting second patterns that differ from the first patterns and are configured to achieve the operational objective; and responsive to the feedback, selecting the second patterns, and generating second illumination patterns based on the second patterns to illuminate the target.

20 Claims, 9 Drawing Sheets

(56) References Cited

U.S. PATENT DOCUMENTS

| | | | | |
|---|---|---|---|---|
| 8,878,773 | B1* | 11/2014 | Bozarth | G06F 3/042 |
| | | | | 382/103 |
| 8,917,395 | B2 | 12/2014 | Dalgleish et al. | |
| 9,274,597 | B1* | 3/2016 | Karakotsios | G06F 3/0346 |
| 9,557,568 | B1* | 1/2017 | Ouderkirk | G02B 13/0055 |
| 10,217,286 | B1* | 2/2019 | Angel | G06F 3/013 |
| 10,436,909 | B2 | 10/2019 | Ouyang et al. | |
| 10,466,484 | B1* | 11/2019 | Yoon | H04N 13/332 |
| 10,466,779 | B1* | 11/2019 | Liu | G02B 27/0093 |
| 10,502,963 | B1* | 12/2019 | Noble | B29D 11/0073 |
| 10,701,280 | B1 | 6/2020 | Lee et al. | |
| 11,176,367 | B1* | 11/2021 | Fix | G06T 7/521 |
| 11,581,947 | B2 | 2/2023 | Bucklew et al. | |
| 2008/0143820 | A1* | 6/2008 | Peterson | G06T 7/97 |
| | | | | 348/E7.001 |
| 2008/0212942 | A1* | 9/2008 | Gordon | H04N 21/2365 |
| | | | | 348/E7.071 |
| 2009/0196460 | A1* | 8/2009 | Jakobs | G06V 40/19 |
| | | | | 382/103 |
| 2011/0234750 | A1* | 9/2011 | Lai | G03B 37/04 |
| | | | | 348/E7.001 |
| 2012/0249957 | A1* | 10/2012 | Shibata | A61B 3/0025 |
| | | | | 351/206 |
| 2012/0250980 | A1* | 10/2012 | Gillard | H04N 19/46 |
| | | | | 382/173 |
| 2012/0254369 | A1* | 10/2012 | Gillard | H04N 21/4622 |
| | | | | 709/219 |
| 2012/0257005 | A1* | 10/2012 | Browne | G02B 27/017 |
| | | | | 348/E7.001 |
| 2013/0182066 | A1* | 7/2013 | Ishimoto | E02F 9/261 |
| | | | | 348/38 |
| 2014/0037213 | A1* | 2/2014 | Niederberger | G06T 11/00 |
| | | | | 382/195 |
| 2014/0049452 | A1* | 2/2014 | Maltz | G02B 27/017 |
| | | | | 345/8 |
| 2016/0029883 | A1* | 2/2016 | Cox | G06V 40/19 |
| | | | | 351/209 |
| 2016/0085300 | A1* | 3/2016 | Robbins | H04N 23/673 |
| | | | | 345/633 |
| 2016/0241892 | A1* | 8/2016 | Cole | G06T 17/20 |
| 2016/0342205 | A1* | 11/2016 | Shigeta | G06V 40/197 |
| 2017/0299722 | A1 | 10/2017 | Ouyang et al. | |
| 2018/0046859 | A1* | 2/2018 | Jarvenpaa | A61B 3/113 |
| 2018/0048793 | A1* | 2/2018 | Gross | H04N 25/61 |
| 2018/0275409 | A1* | 9/2018 | Gao | G02B 27/0172 |
| 2018/0307048 | A1* | 10/2018 | Alexander | G03H 1/26 |
| 2019/0086674 | A1* | 3/2019 | Sinay | G02B 27/0172 |
| 2020/0158837 | A1 | 5/2020 | Sharma et al. | |
| 2020/0183174 | A1* | 6/2020 | Noui | G06F 3/013 |
| 2020/0368616 | A1* | 11/2020 | Delamont | H04N 13/239 |
| 2021/0011284 | A1* | 1/2021 | Andreev | G02B 27/0179 |
| 2021/0041948 | A1* | 2/2021 | Berkner-Cieslicki | |
| | | | | G06F 3/011 |
| 2022/0197376 | A1* | 6/2022 | Boyle | G02B 27/0093 |
| 2022/0382064 | A1* | 12/2022 | Rohn | G02B 1/002 |
| 2022/0394234 | A1* | 12/2022 | Etigson | G02B 30/10 |
| 2022/0397956 | A1* | 12/2022 | Lundell | G02B 27/0093 |
| 2022/0413302 | A1* | 12/2022 | Meitav | G02B 27/0172 |
| 2022/0413603 | A1* | 12/2022 | Held | G02B 27/0093 |
| 2023/0073094 | A1 | 3/2023 | Bauman et al. | |
| 2023/0142045 | A1 | 5/2023 | Bucklew et al. | |

OTHER PUBLICATIONS

Matthew Edgar, et al., "Real-time computational photon-counting LiDAR", Opt. Eng. 57(3), 031304 (2017), doi: 10.1117/1.OE.57.3.031304., Mar. 2018, 8 pages.

E.P. McShane, et al., "High resolution TCSPC imaging of diffuse light with a one-dimensional SPAD array scanning system", vol. 30, No. 15 / Jul. 18, 2022 / Optics Express 27926, Jul. 15, 2022, 12 pages.

Aurora Maccarone, et al., "Submerged single-photon LiDAR imaging sensor used for real-time 3D scene reconstruction in scattering underwater environments", vol. 31, No. 10 / May 8, 2023 / Optics Express 16690, May 4, 2023, 19 pages.

Guy Satat, et al., "Lensless imaging with compressive ultrafast sensing", IEEE Transactions on Computational Imaging 3, No. 3 (2017): 398-407, 10 pages.

Yoann Altmann, et al., "Quantum-inspired computational imaging", Science 361, 660 (2018), http://dx.doi.org/10.1126/science.aat2298, Aug. 17, 2018, 9 pages.

Ruiqi Liu, et al., "Towards the industrialisation of quantum key distribution in communication networks: A short survey", Industry Article, DOI: 10.1049/qtc2.12044, IET Quant. Comm. 2022;3:151-163, 13 pages.

Assia El Mahdaoui, et al., "Image Denoising Using a Compressive Sensing Approach Based on Regularization Constraints", Sensors 2022, 22, 2199. https://doi.org/10.3390/s22062199, https://www.mdpi.com/journal/sensors, 22 pages.

"CoModGAN: AI-Powered Image Completion", Microsoft AI, https://www.microsoft.com/en-us/ai/ai-lab-comodgan, downloaded from the internet on Mar. 18, 2024, 6 pages.

Huaijin Chen, et al., "FPA-CS: Focal Plane Array-based Compressive Imaging in Short-wave Infrared", CVPR2015 extended abstract, Computer Vision Foundation, 1 page.

Steven Gladstone, "Things You Wanted to Know About Compression but Were Afraid to Ask", Dec. 4, 2017, https://www.bhphotovideo.com/explora/video/tips-and-solutions/things-you-wanted-to-know-about-compression-but-were-afraid-to-ask, downloaded from the internet on Mar. 18, 2024, 6 pages.

Peter Clark, "Analog Devices' Lidar is flying under the radar", Mar. 11, 2019, 2 pages.

Kaushallya Adhikari, et al., "Optimal Sparse Sampling for Detection of a Known Signal in Nonwhite Gaussian Noise", IEEE Signal Processing Letters, vol. 28, 2021, 5 pages.

Dongeek Shin, et al., "Photon-efficient imaging with a single-photon camera", Jun. 24, 2016, DOI: 10.1038/ncomms12046, Nature Communications, 8 pages.

Zheng-Ping Li, et al., "Single-photon computational 3D imaging at 45 km", Research Article, vol. 8, No. 9 / Sep. 2020 / Photonics Research, 9 pages.

Genevieve Gariepy, et al., "Single-photon sensitive light-in-flight imaging", Nature Communications, Jan. 27, 2015, DOI: 10.1038/ncomms7021, 7 pages.

M.E. Gehm, et al., "Single-shot compressive spectral imaging with a dual-disperser architecture", Oct. 17, 2007 / vol. 15, No. 21 / Optics Express 14013, 15 pages.

Edoardo Charbon, et al., "SPAD-Based Sensors", TOF range-imaging cameras (2013): 11-38, 29 pages.

Ahmed Kirmani, et al., "Exploiting sparsity in time-of-flight range acquisition using a single time-resolved sensor", Oct. 24, 2011 / vol. 19, No. 22 / Optics Express 21485, 23 pages.

Oscar Lopez, et al., "Frugal Hyperspectral Imaging via Low Rank Tensor Reconstruction", Proc. of SPIE vol. 12118, 121180H, 2022, 11 pages.

Zibang Zhang, et al., "Hadamard single-pixel imaging versus Fourier single-pixel imaging", vol. 25, No. 16 | Aug. 7, 2017 | Optics Express 19619, 21 pages.

William K. Pratt, et al., "Hadamard Transform Image Coding", Proceedings of the IEEE, vol. 57, No. 1, Jan. 1969, 15 pages.

Xiaohui Shi, et al., "Image quality enhancement in low-light-level ghost imaging using modified compressive sensing method", Laser Phys. Lett. 15 (2018) 045204 (8pp), https://doi.org/10.1088/1612-202X/aaa5f6, 9 pages.

Pater A. Morris, et al., "Imaging with a small No. of photons", Jan. 5, 2015, DOI: 10.1038/ncomms6913, Nature Communications, 6 pages.

Aongus McCarthy, et al., "Long-range time-of-flight scanning sensor based on high-speed time-correlated single-photon counting", Nov. 4, 2009, vol. 48, No. 32, Applied Optics, 11 pages.

Ori Katz, et al., "Looking around corners and through thin turbid layers in real time with scattered incoherent light", Jul. 15, 2012, DOI: 10.1038/NPHOTON.2012.150, 5 pages.

(56) References Cited

OTHER PUBLICATIONS

Emmanuel J. Candes, et al., "Matrix Completion with Noise", arXiv:0903.3131v1 [cs.IT] Mar. 18, 2009, 11 pages.
Gabriel Barello, et al., "Sparse-Coding Variational Auto-Encoders", https://doi.org/10.1101/399246, Aug. 29, 2018, 20 pages.
Aurora Maccarone, et al., "Submerged single-photon LiDAR imaging sensor used for real-time 3D scene reconstruction in scattering underwater environments", vol. 31, No. 10 / May 8, 2023 / Optics Express 16690, 19 pages.
Molly N. Sing, et al., "Super-resolution projection: Leveraging the MEMS speed to double or quadruple the resolution", Proc. of SPIE vol. 10932, 109320R-1, doi: 10.1117/12.2512005, 10 pages.
Lindsey N. Hillesheim, et al., "The Photon Counting Histogram in Fluorescence Fluctuation Spectroscopy with Non-Ideal Photodetectors", Biophysical Journal, vol. 85, Sep. 2003, 11 pages.
Neil Finlayson, et al., "Time-correlated single photon Raman spectroscopy at megahertz repetition rates", vol. 46, No. 17, Sep. 1, 2021, Optics Letters, 4 pages.
Dennis C. Estrada, et al., "Underwater LiDAR Image Enhancement Using a GAN Based Machine Learning Technique", IEEE Sensors Journal, vol. 22, No. 5, Mar. 1, 2022, 14 pages.
Chockalingam Veerappan, et al., "A 160× 128 Single-Photon Image Sensor with On-Pixel 55ps 10b Time-to-Digital Converter", ISSCC 2011 / SESSION 17 / Biomedical & Displays / 17.7, 3 pages.
Robert K. Henderson, et al., "A 192 × 128 Time Correlated SPAD Image Sensor in 40nm CMOS Technology", IEEE Journal of Solid-State Circuits, ISSN 0018-9200, http://dx.doi.org/10.1109/JSSC.209.2905163, 14 pages.
Wonsang Hwang, et al., "Achieving a high photon count rate in digital time-correlated single photon counting using a hybrid photodetector", vol. 29, No. 7 / Mar. 29, 2021 / Optics Express 9797, 8 pages.
Federica Villa, et al., "CMOS Imager With 1024 SPADs and TDCs for Single-Photon Timing and 3-D Time-of-Flight", IEEE journal of selected topics in quantum electronics 20, No. 6 (2014): 364-373, 9 pages.
Ahmed Kirmani, et al., "CODAC: A Compressive Depth Acquisition Camera Framework", In 2012 IEEE International Conference on Acoustics, Speech and Signal Processing (ICASSP), pp. 5425-5428. IEEE, 2012, 4 pages.
A. Kadambi, et al., "Coded Aperture Compressive 3-D LIDAR", TR2015-028, Apr. 2015, IEEE International Conference on Acoustics, Speech, and Signal Processing (ICASSP), 7 pages.
Akhil Kallepalli, et al., "Compressed sensing in the far-field of the spatial light modulator in high noise conditions", Scientific Reports, (2021) 11:17460, https://doi.org/10.1038/s41598-021-97072-2, 8 pages.
David L. Donoho, et al., "Compressed Sensing", Sep. 14, 2004, IEEE Transactions on information theory 52, No. 4 (2006): 1289-1306, 34 pages.
Aurora Maccarone, et al., "Custom-Technology Single-Photon Avalanche Diode Linear Detector Array for Underwater Depth Imaging", Sensors 2021, 21, 4850, https://doi.org/10.3390/s21144850, Jul. 16, 2021, 16 pages.
Bing Ouyang, et al., "Near-infrared compressive line sensing imaging system using individually addressable laser diode array", Compressive Sensing IV, edited by Fauzia Ahmad, Proc. of SPIE vol. 9484, downloaded from the internet on Jun. 3, 2015, 12 pages.
John J. Degnan, "Scanning, Multibeam, Single Photon Lidars for Rapid, Large Scale, High Resolution, Topographic and Bathymetric Mapping", Remote Sens. 2016, 8, 958; doi: 10.3390/rs8110958, www.mdpi.com/journal/remotesensing, 23 pages.
Adithya Kumar Pediredla, et al., "Signal Processing Based Pile-up Compensation for Gated Single-Photon Avalanche Diodes", arXiv:1806.07437v1 [physics.ins-det] Jun. 14, 2018, 17 pages.

\* cited by examiner

FOUR PATTERNS (CODEBOOK ENTRIES) EACH WITH MULTIPLE BEAMLETS ON

402

FOUR PATTERNS (CODEBOOK ENTRIES) EACH WITH ONLY A SINGLE BEAMLET ON

US 12,395,750 B1

QUANTUM-INSPIRED ADAPTIVE COMPUTATIONAL 3D IMAGER

TECHNICAL FIELD

The present disclosure relates to a photonic imaging system and method.

BACKGROUND

A time-correlated single photon counting (TCSPC) imaging system generates illumination patterns, and transmits the illumination patterns through a medium, such as space, air, or water to illuminate a target deployed in the medium. The TCSPC imaging system transmits a number of the illumination patterns over a dwell time, which establishes a video frame rate for the system. The TCSPC imaging system detects light energy of the illumination patterns that is reflected from the target, and reconstructs an image of the target from the detected light. Factors that can corrupt the detected light and degrade a quality of the reconstructed image include optical refraction, diffraction, scattering, and attenuation of the illumination patterns as they propagate through the medium. Conventional TCSPC imaging systems employ limited hardware architectures and fixed, inflexible, processing techniques that make it difficult to balance acceptable TCSPC performance, such as image quality, against the video frame rate, a time to reconstruct the image, and noise mitigation.

DESCRIPTION

Overview

Figure 1:
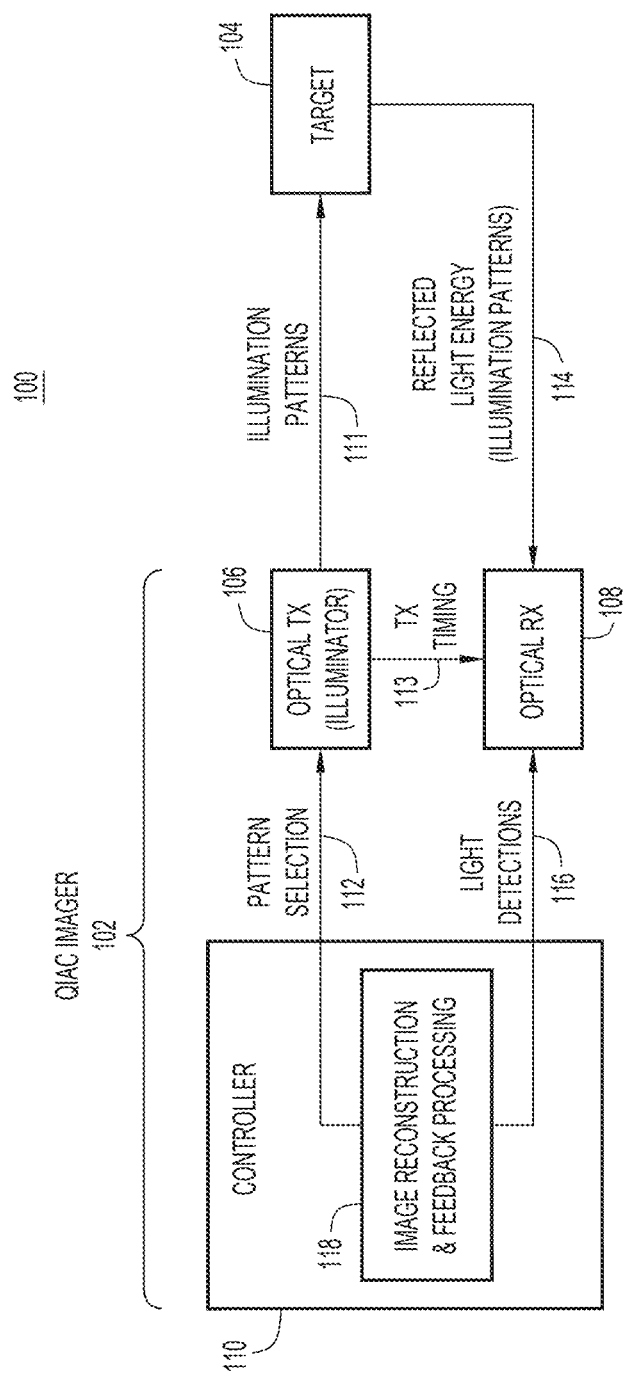
FIG. 1 is a high-level block diagram of an example optical environment in which an example quantum-inspired adaptive computational (QIAC) three-dimensional (3D) (QIAC 3D) imager (referred to simply as a "QIAC imager") may be employed.

In an embodiment, a method is performed by a photon imaging system. The method comprises: selecting first patterns for illumination, and generating first illumination patterns that are time-varying responsive to the first patterns in order to illuminate a target; detecting light energy of the first illumination patterns that is reflected by the target; constructing histograms of the light energy that is detected; reconstructing an image of the target using the histograms and the first patterns; performing feedback processing of the image based on an operational objective, associated with one or more of generating illumination patterns or reconstructing the image, to produce feedback for selecting second patterns that differ from the first patterns and are configured to achieve the operational objective; and responsive to the feedback, selecting the second patterns, and generating second illumination patterns based on the second patterns to illuminate the target.

In another embodiment, an apparatus comprises: a controller to select patterns for illumination; an optical transmitter including an individually addressable laser array (IALA) to produce illumination patterns responsive to the patterns, to illuminate a target; and an optical receiver including: a non-imaging lens to receive light energy of the illumination patterns that is reflected by the target, to produce non-imaged light energy; and a single-photon avalanche diode (SPAD) array to detect the non-imaged light energy across the SPAD array, to produce an array of light detections; wherein the controller is configured to: construct histograms of the array of the light detections; and reconstruct an image of the target using the histograms and the patterns.

EXAMPLE EMBODIMENTS

Embodiments presented herein are directed to a quantum-inspired adaptive computational (QIAC) three-dimensional (3D) (QIAC 3D) imager (referred to simply as a "QIAC imager") that includes an improved hardware architecture and dynamic, adaptive, operational (i.e., performance) objective-based processing techniques configured to achieve improved performance over conventional TCSPC imaging systems. In some aspects, the QIAC imager may be considered an improved TCSPC imaging system that is "quantum-inspired" due, in part, to photonic counting/detection and processing employed by the QIAC imager. The QIAC imager employs an adaptive illuminator to spatially modulate a field-of-view (FOV) and then reconstructs under-sampled images reflected from the FOV in particle induced scattering and turbulent media. Based on the aforementioned features, the QIAC imager maintains or improves a quality of a reconstructed image, while (i) reducing a number, and a video frame rate of, illumination patterns used to reconstruct the image, (ii) minimizing a processing time to reconstruct the image, and (iii) maximizing noise mitigation. These and other advantages and features of the QIAC imager and related methods will become apparent from the ensuing description.

FIG. 1 is a high-level block diagram of an example optical environment 100 in which an example QIAC imager 102 (referred to more generally as a "photon imaging system") configured according to embodiments presented herein illuminates a target 104 disposed in an optically transmissive medium (e.g., space, air, or water), and processes light energy reflected from the target. QIAC imager 102 may be part of a light detection and ranging (LIDAR) system.

QIAC imager 102 includes an optical transmitter (TX) 106, an optical receiver (RX) 108, and a controller 110 coupled to, and configured to control, the optical TX and the optical RX. Optical TX 106 generates a sequence of illumination patterns 111 (also referred to simply as "illumination patterns") that are time-varying responsive to patterns selected by a pattern selection signal 112, and transmits the illumination patterns toward target 104. Optical TX 106 also generates, and provides to optical RX 108, a TX timing signal 113 that indicates transmit times of illumination patterns 111.

Optical RX 108 receives reflected light energy 114 from target 104 (i.e., light energy of illumination patterns 111 that is reflected by target 104 toward the optical receiver). TX timing signal 113 triggers optical RX 108 to detect reflected light energy (i.e., photons) to produce light detections 116 (i.e., detected light energy), and provides the same to controller 110. Controller 110 includes processing modules 118 that perform image reconstruction and adaptive feedback processing based on light detections 116 to produce pattern selection signal 112, and provides the same to optical TX 106 as a feedback control signal.

Controller 110, optical TX 106, and optical RX 108 operate collectively to form a feedback loop that repeatedly/cyclically adapts illumination patterns 111 over time as follows. First, controller 110 provides to optical TX 106 pattern selection signal 112, and the optical TX 106 generates (and transmits to target 104) illumination patterns 111 responsive to patterns selected by the pattern selection signal. Second, optical RX 108 detects reflected energy 114 (i.e., reflected illumination patterns) to produce light detections 116. Fourth, controller 110 processes light detections 116 to adapt pattern selection signal 112 (i.e., to produce an adapted pattern selection signal). Fifth, optical TX 106 adapts illumination patterns 111 responsive to the adapted pattern selection signal, to produce adapted illumination patterns. The foregoing operations repeat over time.

Figure 2:
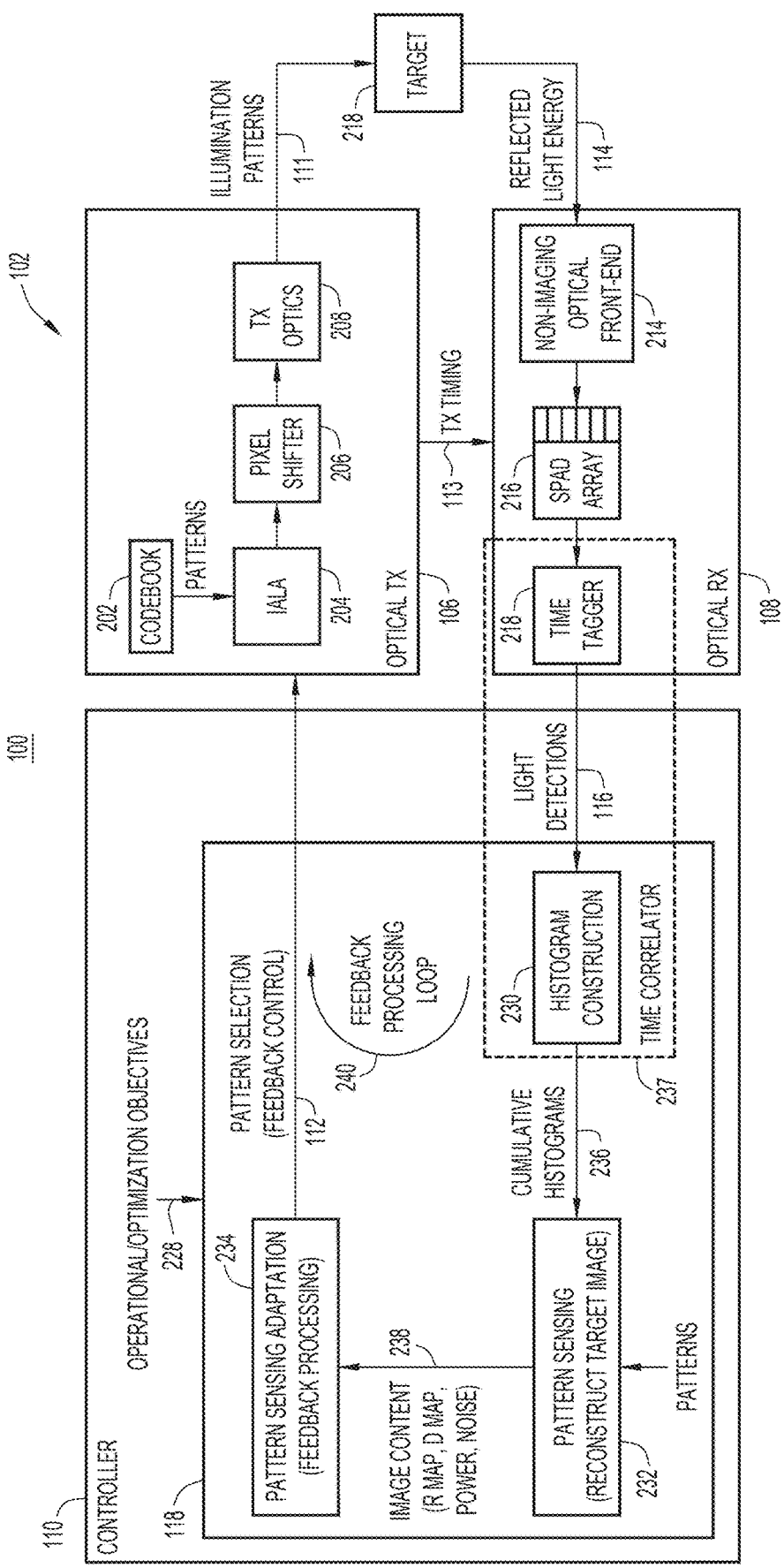
FIG. 2 is a block diagram that expands on an optical transmitter (TX), an optical receiver (RX), and a controller of the QIAC imager, according to an embodiment.

FIG. 2 is a block diagram of QIAC imager 102 that expands on the block diagram of FIG. 1. Optical TX 106, optical RX 108, and controller 110 are now described in further detail with reference to FIG. 2. Optical TX 106 includes a codebook 202 of patterns (also referred to as a "pattern codebook"), an individually addressable laser array (IALA) 204, an optional pixel shifter 206, and TX optics 208 arranged in series. More generally, any high pixel density individually controllable multi-element illumination device may be employed in optical TX 106, including, but not-limited to, the IALA, a laser and micro-electromechanical system (MEMS) combination, a laser and digital mirror device (DMD) combination, and the like. Codebook 202 stores patterns (also referred to as "codebook patterns") used to produce corresponding illumination patterns. Each pattern represents a 2D (i.e., planar) array (e.g., an N×N array) of pixel control elements that each indicate either ON or OFF for a corresponding pixel of a corresponding illumination pattern. Pattern selection signal 112 selects patterns (also referred to as "selected patterns") to be applied to IALA 204 by codebook 202, and the codebook applies the (selected) patterns to the IALA.

IALA 204 includes a planar array (e.g., an N×N array) of individually addressable pixels that collectively produce an illumination pattern that has a planar spatial arrangement or spatial grid of illuminated and non-illuminated pixels controlled by the pattern when applied to the IALA. IALA 204 generates the illumination pattern with a fixed resolution that is dictated by a size of each individually addressable pixel of the IALA. To achieve such spatial light modulation, the pattern pixel control elements control (i.e., turn ON or turn OFF) corresponding ones of the individually addressable pixels (e.g., lasers), which represent corresponding ones of the pixels of the illumination pattern. In this way, IALA 204 generates the illumination pattern responsive to the pattern.

By extension, a sequence of different patterns applied to IALA 204 over time cause the IALA to generate a corresponding/matching sequence of time-varying illumination patterns, also referred to as "spatio-temporally modulated light" and "structured illumination." IALA 204 generates n illumination patterns (responsive to the same number of selected patterns) over a dwell time t, which establishes a video frame rate (VFR) (sometimes referred to simply as a "frame rate") of the illumination patterns when detected/processed by optical RX 108 and controller 110, where VFR a n/t. An increase or decrease in the number n during the dwell time t results in a corresponding increase or decrease in the VFR. Similarly, increases or decrease in the dwell time results in a corresponding decrease or increase in the VFR. Optical TX 106 additionally generates, and provides to optical RX 108, TX timing signal 113 that indicates successive times at which IALA 204 generates illumination patterns during the dwell time, and which triggers optical RX 108 to detect photons of reflections of the illumination patterns.

IALA 204 provides to pixel shifter 206 the illumination patterns with the fixed resolution size. Pixel shifter 206 operates to increase the resolution size of each illumination pattern. Pixel shifter 206 includes an actuator array to physically shift a position of each pixel of each illumination pattern (from IALA 204) slightly, e.g., to dither the position slightly. The position shift may be less than a full size of each pixel. As a result, pixel shifter 206 generates pixel-shifted illumination patterns, each with an increased resolution size. Pixel shifter 206 transmits the pixel-shifted illumination patterns (as illumination patterns 111) toward target 104 through TX optics 208. In some embodiments, pixel shifter 206 may be omitted.

Optical RX 108 includes a non-imaging optical front-end 214, a single-photon avalanche diode (SPAD) array 216 that includes an array of SPADs, and a time-tagger 218 arranged in series. In an example, non-imaging optical front-end 214 includes a diffuser (e.g., a non-imaging lens, not shown) that receives reflected light energy 114, and diffuses or spreads the reflected energy to produce diffuse/non-imaged light energy, and provides the same to SPAD array 216 (i.e., a planar array of individual SPADs). The individual SPADs of SPAD array 216 collectively form a planar light-detection face to receive the non-imaged light energy of each reflected illumination pattern that is spread across the face of the SPAD array.

The individual SPADs detect the diffuse/non-imaged light energy (i.e., photons) impinging on their faces in parallel, to produce an array of light detections (one light detection per SPAD) for each illumination pattern. The array of light detections represent an array of (detected) pixels. Thus, the entire SPAD array 216 functions as a "bucket detector" for photons. Time-tagger 218 applies time stamps (i.e., photon time-of-arrivals) to the light detections (i.e., the photon detections) based on TX timing signal 113, to produce an array of time-stamped light detections in parallel (e.g., an array of pixels) for each illumination pattern, and forwards the same to controller 110. Time-tagger 218 uses TX timing signal 113 to determine a time-of-arrival of each photon received/detected by SPAD array 216. The time stamps correlate the light detections in the array of light detections to each other, and to a corresponding pattern from codebook 202. The aforementioned parallel photon detection/collection is similar to running a Monte Carlo model in parallel mode. Over time, optical RX 108 provides to controller 110 a sequence of arrays of time-stamped light detections (denoted light detections 116) corresponding to the sequence of illumination patterns detected by the optical RX.

Controller 110 includes modules 118 to process the arrays of time-stamped light detections (i.e., to process the detected pixel arrays/light detection arrays) to produce/adapt pattern selection signal 112 based on predetermined operational objectives 228, described below. Operational objectives may also be referred to as "processing objectives," "performance objectives," and "optimization objectives." Also, the terms objective/objectives and criterion/criteria may be used interchangeable. Each objective may include an operational parameter to be optimized, for example. Modules 118 include histogram construction 230, pattern sensing 232, and pattern sensing adaptation 234, which cooperate to reconstruct an image of target 104 (also referred to as a "reconstructed image"), and to produce pattern selection signal 112, which selects/adapts the patterns/illumination patterns 111 to achieve operational objectives 228. Non-limiting examples of operational objectives 228 may include/relate to a pixel power in the image, a quality of the image, VFR, a region-of-interest (ROI) of the image, noise (e.g., scatter and turbulence) mitigation, and so on.

Histogram construction 230 receives the arrays of time-stamped light detections. Histogram construction 230 constructs or builds an array of histograms (i.e., a set of histograms) in parallel based on each array of time-stamped light detections, and thus for each (reflected) illumination pattern. The histograms measure light energy detected by corresponding ones of the individual SPADs (i.e., measure the light energy of each detected pixel). Together, histogram construction 230 and time-tagger 218 collectively form a time correlator 237 that correlates the array of histograms to a corresponding pattern from codebook 202.

Next, histogram construction 230 combines or accumulates each set of histograms into a combined or cumulative histogram for each illumination pattern. The cumulative histogram indicates a total light energy produced by the corresponding illumination pattern. That is, generating the cumulative histogram includes determining the total light energy. Over time, histogram construction 230 generates cumulative histograms 236 for corresponding ones of the illumination patterns (one cumulative histogram per illumination pattern), and provides the same to pattern sensing 232. Histogram construction 230 may employ compressive sensing (CS) and machine learning (ML) techniques to aid with the histogram reconstruction, such as to remove noise, jitter, and to perform missing pixel estimation from neighboring pixels, for example.

Pattern sensing 232 may receive as inputs cumulative histograms 236 corresponding to illumination patterns 111, the patterns applied to IALA 204, and operational objectives 228. Pattern sensing 232 reconstructs an image of target 104 based on the aforementioned inputs to produce image content 238 indicative of an image of target 104 in accordance with the objectives. For example, pattern sensing 232 may construct the image to achieve a desired VFR, to focus on a region-of-interest using image/feature templates, and/or to mitigate scatter and/or turbulence. Image content 238 may include a two-dimensional (2D) reflectance (R) map (e.g., a 2D grey-scale image showing reflected power for each pixel), a depth (D) map (which indicates a distance to highest returns), detected power/energy for each of the pixels of each reflected illumination pattern, noise estimates for each reflected illumination pattern, and so on.

Pattern sensing adaptation 234 receives as inputs image content 238 and operational objectives 228, generates pattern selection signal 112 based on the inputs, and provides the pattern selection signal to optical TX 106. Pattern selection signal 112 repeatedly selects/adapts patterns used to generate illumination patterns 111 over time according to operational objectives 228. Together, histogram construction 230, pattern sensing 232, and pattern sensing adaptation 234 collectively form a feedback loop 240 that processes the reflected illumination patterns. That is, feedback loop 240 includes feedback processing of the reflected illumination patterns.

Examples of operational objective-based imaging performed by feedback loop 240 are provided below. Generally, the examples assume an initial operation in which pattern sensing adaptation 234 selects initial patterns to generate a number of initial illumination patterns over a dwell time, which establishes an initial VFR and initial sensing conditions. The initial patterns/illumination patterns may include random patterns/illumination patterns to sense the environment. Feedback loop 240 processes reflected light energy 114 for the initial illumination patterns according to one or more of the operational objectives, as listed below. In response, pattern sensing adaptation 234 selects subsequent/adapted illumination patterns for the dwell time or a reduced dwell time. The adapted illumination patterns reflect/achieve the performance objectives. QIAC imager 102 relies on the feedback to adapt the illumination patterns relative to the initial illumination patterns to achieve the operational objectives.

VFR example. In the VFR example, image reconstruction by pattern sensing 232 and pattern selection by pattern sensing adaptation 234 are optimized to select as the new patterns a subset of the initial patterns (i.e., a reduced number of the initial patterns) to produce a suitable image while maintaining a high VFR (e.g., to increase the VFR). The optimization is based on a combination of image quality (e.g., ensuring that image quality meets a quality criteria), a minimum number of patterns, and a minimum dwell time (e.g., to generate a minimum number of patterns during a minimum dwell time while maintaining the image quality). The initial patterns may include m patterns, and the new patterns may include p patterns, where m<<p. The dwell time for the new patterns may be less than the dwell time for the initial patterns. The result may be to increase the VFR.

ROI example. In the ROI example, image reconstruction by pattern sensing 232 and pattern selection by pattern sensing adaptation 234 are optimized to select as the new patterns a subset of the initial patterns that focus primarily on the ROI. Such processing may include, but is not limited to, an ML image classification algorithm to determine objects of interest via template matching (i.e., matching against templates indicative of the ROI or particular image features). Once the processing determines an ROI based on the initial patterns/illumination patterns, the processing selects the new patterns/illumination patterns to only illuminate the ROI (i.e., a reduced number of patterns/illumination patterns), which may increase the VFR (when the dwell time is also reduced) and/or increase resolution. In an example, the initial patterns may include illuminated pixels scattered randomly across all four quadrants of the 2D area of the illumination pattern, while the new patterns only include illuminated pixels grouped into a small area, such as in one of the four quadrants.

Scatter/turbulence mitigation example. In this example, image reconstruction by pattern sensing 232 and pattern selection by pattern sensing adaptation 234 are optimized to select the new patterns based on an image quality measure such as contrast signal-to-noise ratio (CSNR), backscatter estimation, peak SNR (PSNR)/structural similarity (SSIM), and the like. The optimization mitigates noise and non-image bearing photons caused by scatter and turbulence.

Total light energy example. In this example, image reconstruction by pattern sensing 232 and pattern selection by pattern sensing adaptation 234 are optimized to select the new patterns based on total light energy, e.g., to maximize the total light energy. The processing determines a subset of the initial patterns/illumination patterns that produced the highest total reflected light energy/power (e.g., the top 5%), and selects only that subset (e.g., 5%) as the new patterns/illumination patterns. For a given or reduced dwell time, this may also reduce the VFR.

Figure 3:
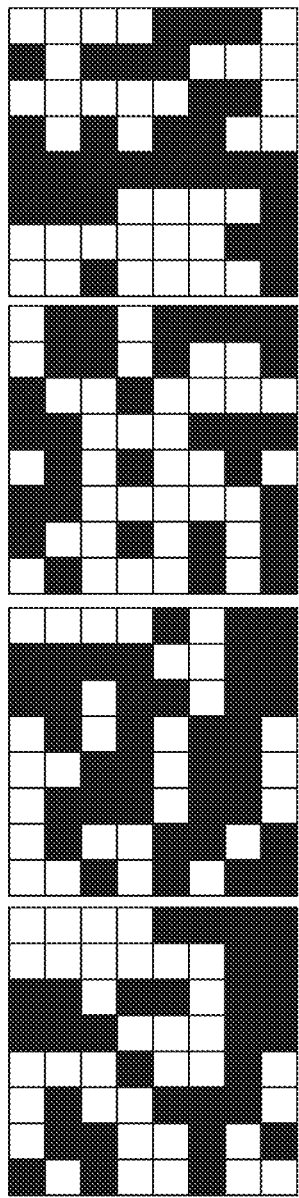
FIG. 3 shows an example sequence of illumination patterns generated by the QIAC imager when operating in a pattern scanning mode.

QIAC imager 102 may operate in multiple scanning modes based on the patterns stored in codebook 202. FIG. 3 shows an example sequence of four illumination patterns 302 (which represent an example of illumination patterns 111) generated by optical TX 106 and processed by optical RX 108 when QIAC imager 102 operates in a pattern scanning mode. Illumination patterns 302 each includes a random binary structure. The random binary structure includes a planar array of pixels in which multiple pixels are ON (i.e., turned ON) and multiple pixels are OFF (i.e., turned OFF) concurrently according to a random spatial arrangement based on a Hadamard pattern, for example. A pixel that is ON is referred to as a "beamlet." Pattern sensing 232 may perform image reconstruction using a single pixel imaging algorithm. Compressive sensing may be achieved via the feedback loop by only selecting patterns that yield the highest reflected energy (which conveys the most-information) for image reconstruction. For example, based on the feedback loop, select only 16 highest energy patterns among 64 initial patterns as the subsequent patterns to reconstruct an 8×8 pixel image.

Figure 4:
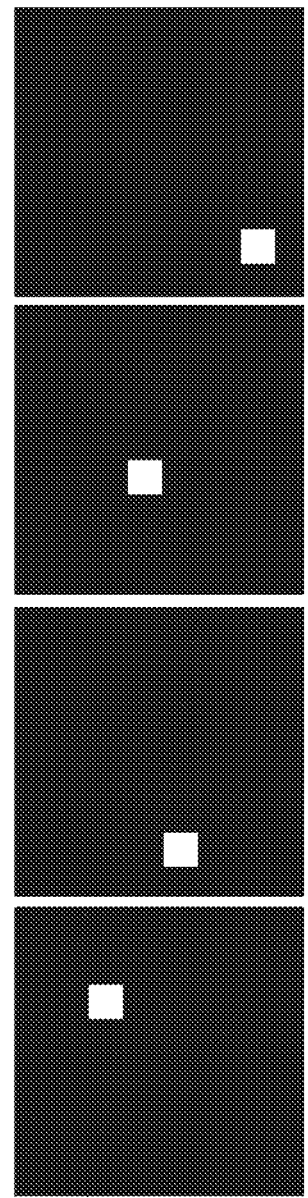
FIG. 4 shows an example sequence of illumination patterns generated by the QIAC imager when operating in a raster scanning mode.

FIG. 4 shows an example sequence of four illumination patterns 402 (which represent an example of illumination patterns 111) generated by optical TX 106 and processed by optical RX 108 when QIAC imager 102 operates in a raster scanning mode. Illumination patterns 402 each includes a random single illuminated pixel, while all other pixels are OFF. Stated otherwise, the raster scanning samples each pixel individually at any given time. For example, a sequence of 64 pixels/patterns are used to generate an 8×8 image. Compressive sensing may be achieved by skipping pixels, estimating skipped pixels (e.g., interpolating adjacent skipped pixels), and optimizing via combined compressive sensing and ML (e.g., use only 32 pixels to reconstruct and 8×8 image.

Figure 5:
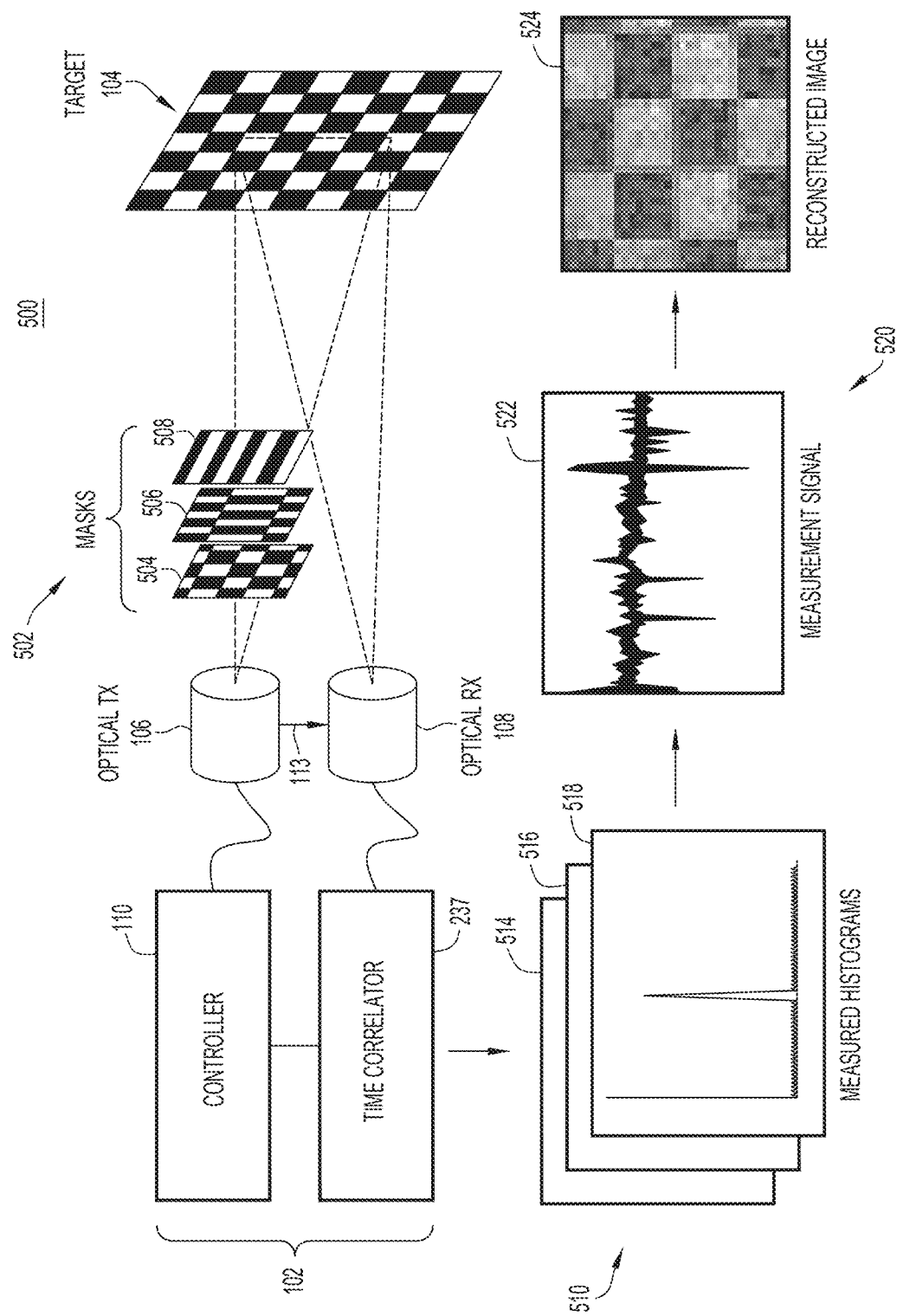
FIG. 5 is an illustration of example operations of image reconstruction performed by the QIAC imager.

FIG. 5 is an illustration of example image reconstruction 500 performed by QIAC imager 102. In the example, at 502, optical TX 106 generates illumination patterns 504, 506, and 508 (also referred to as "masks"), transmits the same to target 104, and provides TX timing signal 113 to optical RX 108. TX timing signal 113 includes timing pulses that coincide with each of the transmitted illumination patterns. Using the techniques described above and time correlator 237, at 510, optical RX 108 detects three reflected illumination patterns and time-tags the same using the timing pulses to produce three arrays of time-stamped light detections (e.g., light detections 116), and provides the same to controller 110. Controller 110 (e.g., histogram construction 230) constructs cumulative histograms 514, 516, and 518 for corresponding ones of illumination patterns 504, 506, and 508 using corresponding ones of the three arrays of time-stamped light detections. At 520, controller 110 (e.g., pattern sensing 232) combines cumulative histograms 514, 516, and 518 into a composite measurement signal 522, and reconstructs and image 524 from the composite measurement signal.

Figure 6:
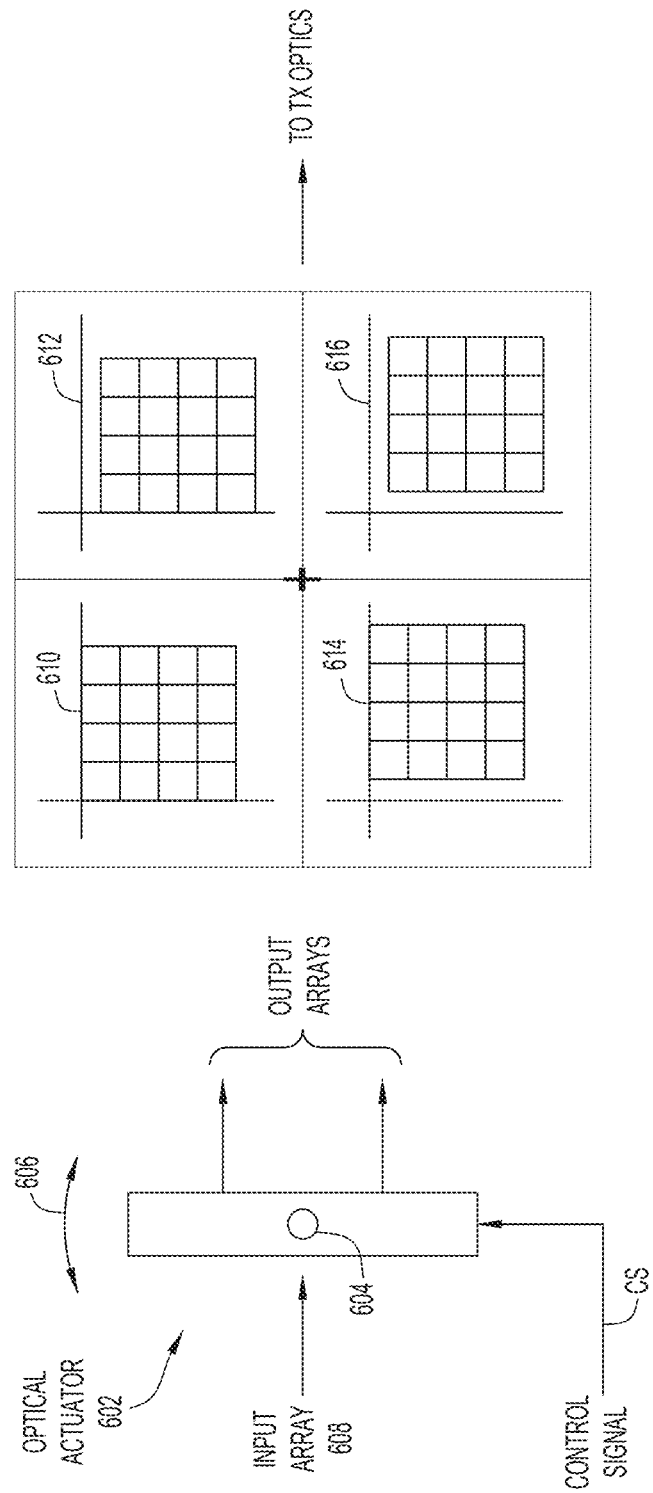
FIG. 6 is an illustration of an example pixel shifter of the optical TX.

FIG. 6 is an illustration of pixel shifter 206 according to an embodiment. In the example of FIG. 6, pixel shifter includes an array of optical actuators, each generally represented as an optical actuator 602 in FIG. 6. Optical actuator 602 is configured for rotational displacement bi-directionally (e.g., by 1-5 degrees) about an axis 604 of the optical actuator, as shown by arrows 606, responsive to a control signal CS generated locally in optical TX 106. The array of optical actuators (including optical actuator 602) receives from IALA 204 an illumination pattern 608 including an input array of pixels. The array of optical actuators produce an output array of pixels at an array position that depends on the displacement. In the example of FIG. 6, the optical actuators (e.g., optical actuator 602) produces, from the input array, output arrays 610, 612, 614, and 616 at first, second, third, and fourth array positions that are slightly shifted relative to each other when the optical actuator is in first, second, third, and fourth actuator position, respectively. Dithering the displacement of the optical actuators (e.g., optical actuator 602) in this manner generates illumination patterns that have higher pixel resolutions from the perspective of image reconstruction algorithms than without the dithering.

Figure 7:
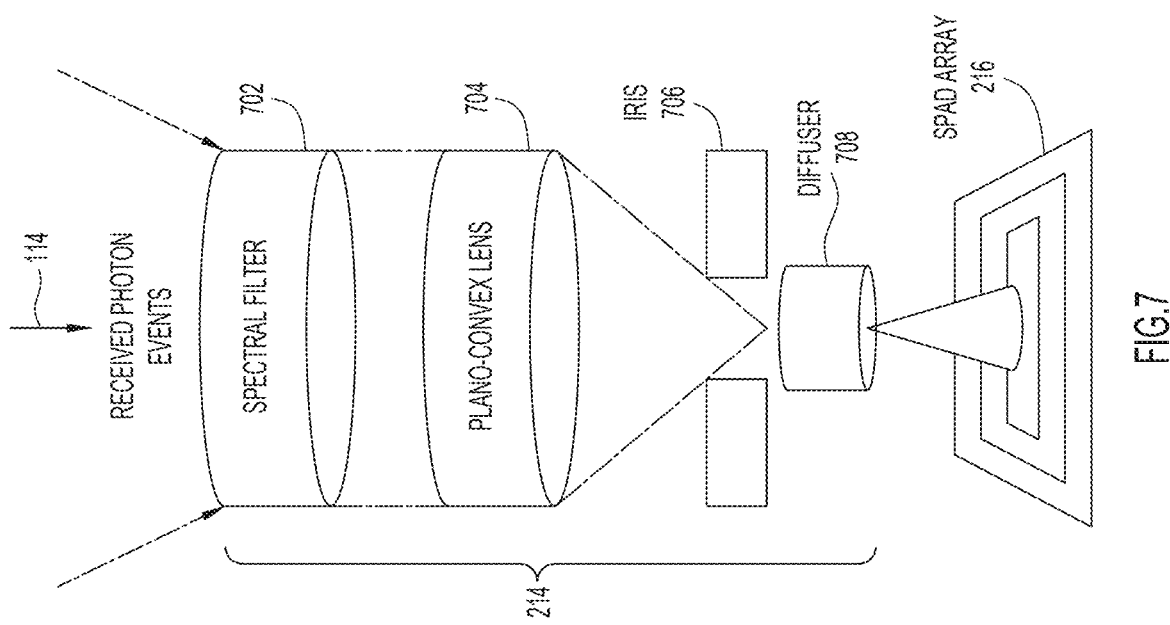
FIG. 7 is an illustration of an example non-imaging optical front-end of the optical RX.

FIG. 7 is an illustration of non-imaging optical front-end 214, according to an embodiment. In the example of FIG. 7, non-imaging optical front-end includes a spectral filter 702 tuned to a wavelength of light (e.g., a green light) used by optical TX 106 to generate illumination patterns 111, a plano-convex lens 704, an iris 706, and a diffuser 708 (e.g., non-imaging lens) in series with each other. Spectral filter 702 spectrally filters reflected light energy 114 to produce filtered light, and provides the same to plano-convex lens 704. Plano-convex lens 704 passes the filtered light to diffuser 708 through iris 706. Diffuser 708 diffuses or spreads the filtered light (as non-imaged light) across the light detection surface of SPAD array 216 in order to illuminate all of the individual SPAD detectors of the SPAD array.

Figure 8:
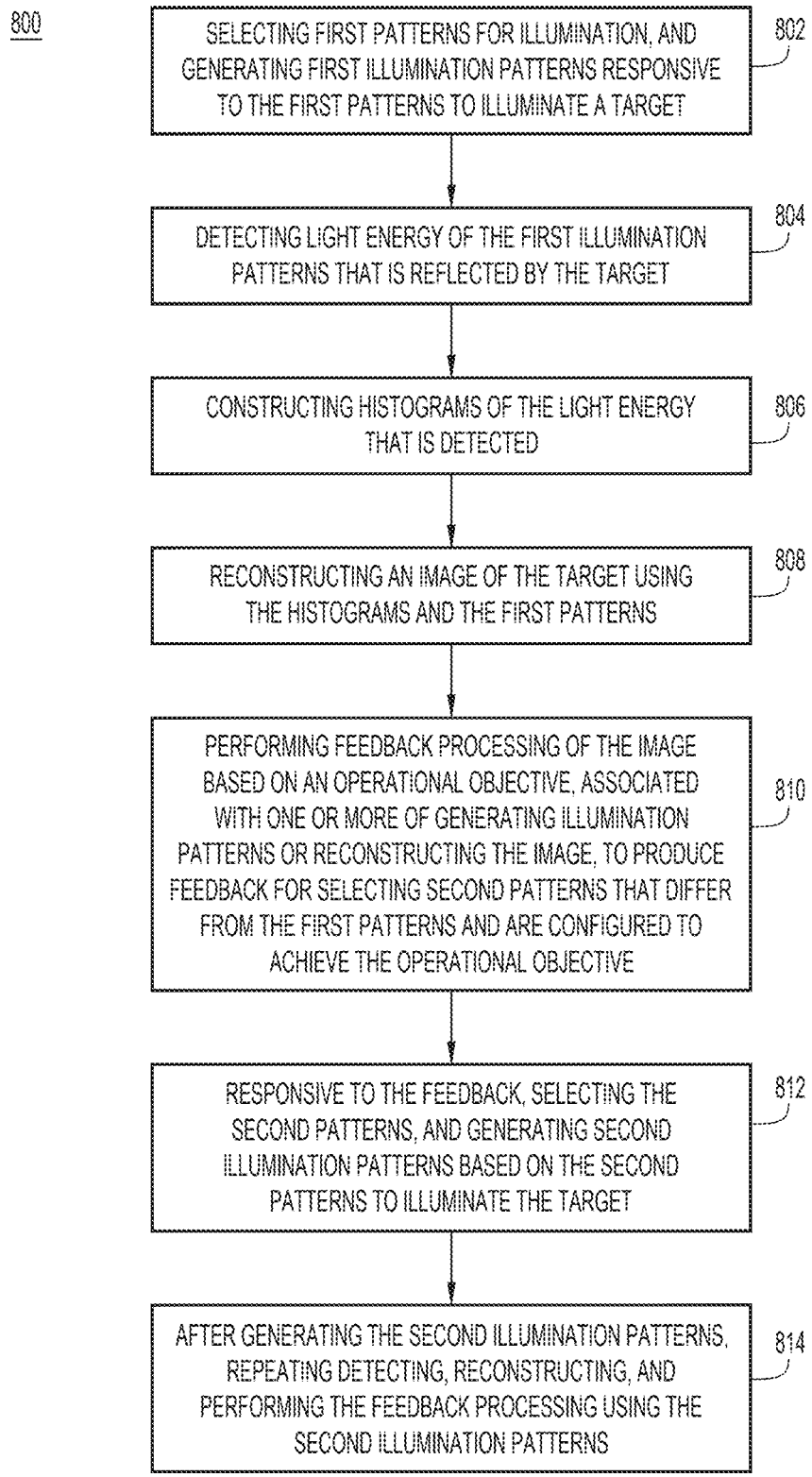
FIG. 8 is a flowchart of example operations performed by the QIAC imager to transmit illumination patterns and process reflections of the illumination patterns in a feedback loop.

FIG. 8 is a flowchart of example operations 800 performed by a photon imaging system (e.g., QIAC imager 102). Operations 800 are described above.

802 includes selecting first patterns for illumination, and generating first illumination patterns responsive to the first patterns in order to illuminate a target. The first illumination patterns may include a first number of the first illumination patterns that are generated/transmitted over a first dwell time to establish a first VFR (e.g., the first number/the first dwell time).

804 includes detecting light energy of the first illumination patterns that is reflected by the target.

806 includes constructing histograms of the light energy that is detected.

808 reconstructing an image of the target using the histograms and the first patterns.

810 performing feedback processing of the image based on an operational objective, associated with one or more of generating illumination patterns or reconstructing the image, to produce feedback for selecting second patterns that differ from the first patterns and are configured to achieve the operational objective. In an example, the feedback is configure to selecting only a subset of the first patterns as the second patterns, i.e., there are fewer second patterns than first patterns.

When the operational objective includes focusing on a region-of-interest, noise mitigation, and optimizing on total energy, one or more of reconstructing the image and/or the feedback processing may include determining a region-of-interest of the target, determining a measure of noise that reduces a quality of the image, and determining total light energies produced by corresponding ones of the first illumination patterns.

812 includes responsive to the feedback, selecting the second patterns, and generating second illumination patterns based on the second patterns to illuminate the target. The second illumination patterns may be generated over a second dwell time that is less than the first dwell time to establish a second VRF that is greater than the first VFR.

814 includes, after generating the second illumination patterns, repeating detecting, reconstructing, and performing the feedback processing using the second illumination patterns.

Figure 9:
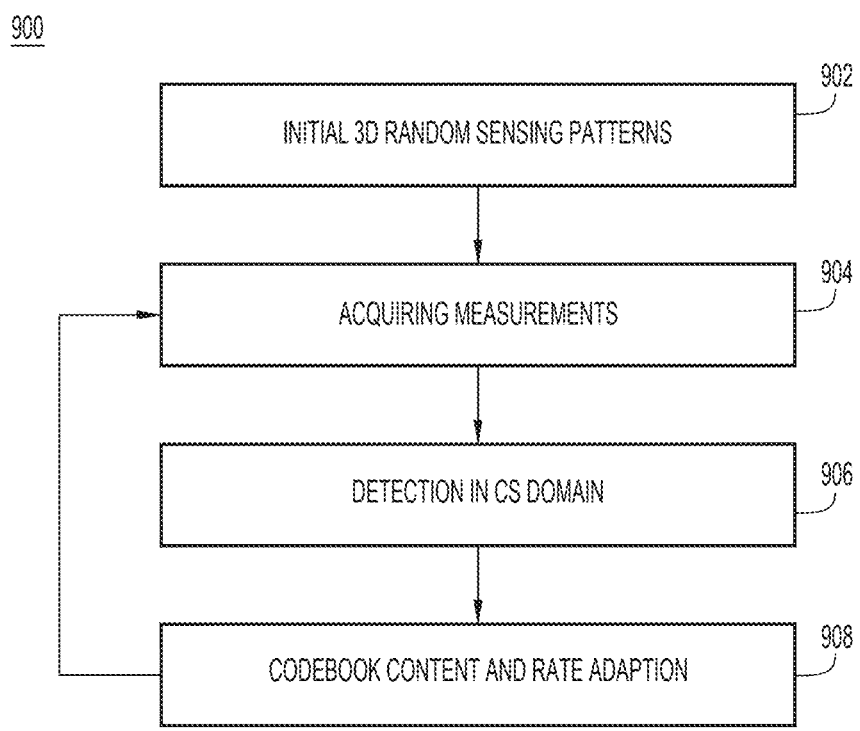
FIG. 9 shows high-level example operations performed by the QIAC imager.

FIG. 9 shows high-level example operations 900 performed by QIAC imager 102. 902 includes generating, from codebook content (i.e., patterns) an initial sequence of random 2D illumination patterns (which, over time, collectively form initial 3D random sensing patterns) generated at a video frame rate to illuminate a target. 904 includes acquiring measurements of light reflections of the 3D sensing patterns from the target. 906 includes detection/image reconstruction of the target in a compressive sensing domain based on the measurements. 908 includes codebook content (e.g., pattern) and video frame rate adaptation based on the compressive sensing and operational objectives.

In summary, embodiments presented herein are directed to a QIAC imager that can actively adapt (e.g., change) sensing patterns to optimize objective-based imaging (e.g., detection, tracking, classification, and the like) in degraded visual environments. The system includes a high pixel density individually controllable multi-element illumination device (e.g., an IALA and pixel shifter) integrated with an improved quantum-inspired TCSPC receiver. The quantum-inspired TCSPC receiver implements a multi-element detection architecture for single pixel TCSPC imaging, such as a quantum-inspired Monte Carlo simulation on hardware.

The system provides multiple levels of speed improvement enabled by an improved hardware/firmware architecture to achieve a desired video frame rate. The system employs ML-based pattern adaptation and optimization, and context-aware histogram reconstruction to reduce sensing pattern shots (i.e., reduce the number of samples and dwell time). This has been shown to achieve a higher signal-to-noise ratio with reduced samples.

An embodiment includes a quantum-inspired SPAD array bucket detector that: uses an entire SPAD array as a bucket detector to build a histogram using all elements of the SPAD array; uses quantum-inspired Monte Carlo simulation on the hardware; is scalable—more array elements results in a shorter times to build histograms; uses a diffuser to project received light onto all elements of the SPAD array; can be implemented in an all-silicon architecture once fully developed.

Another embodiment includes quantum-inspired pattern imaging for underwater imaging, which may use a 5 MHz 515 nm laser, a DMD or IALA illuminator, and a 7×7 SPAD array bucket detector, for example. This incorporates quantum algorithms to capture images in scattering media, and provides further discrimination via photon attributes (e.g., polarization, orbital angular momentum (OAM), coherence, spatial mode, mimicking spontaneous parametric down-conversion (SPDC) using the IALA and the pixel shifter).

Yet another embodiment includes context aware reduction of sensing pattern shots. This uses neighboring pixels and histograms to infill "null pixels" via tensor completion. Reduces the number of samples and dwell time to achieve rate reduction for low probability of intercept (LPI)/low probability of detect (LPD) targets.

Another embodiment includes ML-based pattern adaptation and optimization, which uses an adaptive 3D filtering process to mitigate non-target noise and optimize objective based imaging. The ML process is trained using simulated datasets from known TCSPC imaging models.

Figure 10:
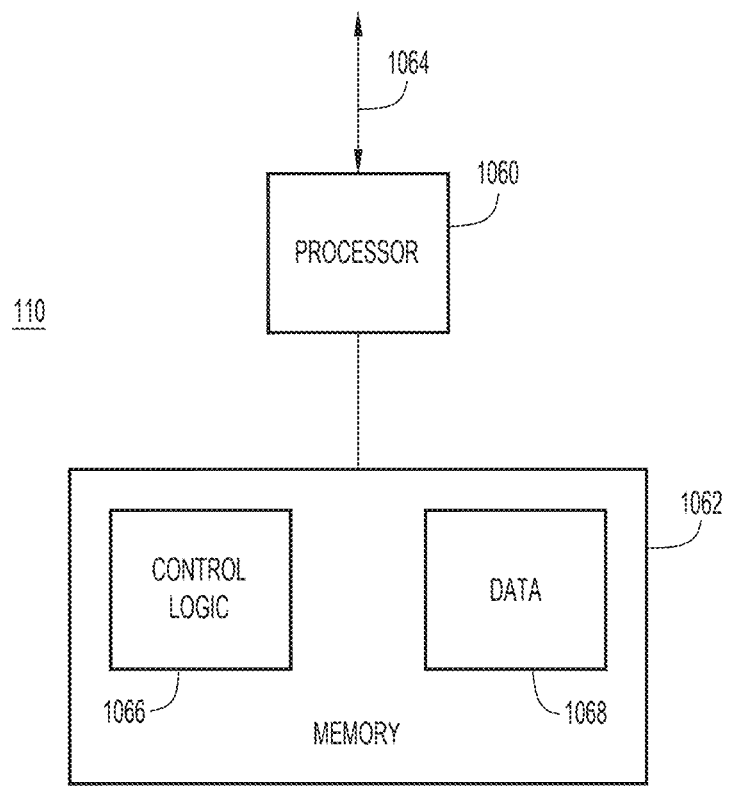
FIG. 10 is a block diagram of an example controller of the QIAC imager.

FIG. 10 is a block diagram of an example of controller 110 configured to perform operations described herein. Controller 110 includes processor(s) 1060 and a memory 1062 coupled to one another. The aforementioned components may be implemented in hardware (e.g., a hardware processor), software (e.g., a software processor), or a combination thereof. Processor(s) 1060 communicates with optical TX 106 and optical RX 108 over hardware and/or software interfaces 1064. Interfaces 1064 may also communicate with user devices through which an operator may interact with controller 110 (e.g., to input and receive data, such as operational objectives). Memory 1062 stores control software 1066 (referred as "control logic"), that when executed by the processor(s) 1060, causes the processor(s), and more generally, controller 110, to perform the various operations described herein. The processor(s) 1060 may be a microprocessor or microcontroller (or multiple instances of such components). The memory 1062 may include read only memory (ROM), random access memory (RAM), magnetic disk storage media devices, optical storage media devices, flash memory devices, electrical, optical, or other physically tangible (i.e., non-transitory) memory storage devices. Controller 110 may also be discrete logic embedded within an integrated circuit (IC) device.

Thus, in general, the memory 1062 may comprise one or more tangible (non-transitory) computer readable storage media (e.g., memory device(s)) including a first non-transitory computer readable storage medium, a second non-transitory computer readable storage medium, and so on, encoded with software or firmware that comprises computer executable instructions. For example, control software 1066 includes logic to implement operations performed by the controller 110.

In addition, memory 1062 stores data 1068 used and produced by control software 1066.

In some aspects, the techniques described herein relate to a method performed by a photon imaging system including: selecting first patterns for illumination, and generating first illumination patterns that are time-varying responsive to the first patterns in order to illuminate a target; detecting light energy of the first illumination patterns that is reflected by the target; constructing histograms of the light energy that is detected; reconstructing an image of the target using the histograms and the first patterns; performing feedback processing of the image based on an operational objective, associated with one or more of generating illumination patterns or reconstructing the image, to produce feedback for selecting second patterns that differ from the first patterns and are configured to achieve the operational objective; and responsive to the feedback, selecting the second patterns, and generating second illumination patterns based on the second patterns to illuminate the target.

In some aspects, the techniques described herein relate to a method, further including: after generating the second illumination patterns, repeating detecting, reconstructing, and performing the feedback processing using the second illumination patterns.

In some aspects, the techniques described herein relate to a method, wherein: selecting the first patterns includes selecting the first patterns from a codebook; and generating the first illumination patterns includes, by an individually addressable light array (IALA), modulating light responsive to the first patterns to produce the first illumination patterns.

In some aspects, the techniques described herein relate to a method, wherein: generating the first illumination patterns further includes pixel shifting modulated light produced by modulating to produce the first illumination patterns as pixel shifted illumination patterns that have a higher pixel resolution than without pixel shifting.

In some aspects, the techniques described herein relate to a method, wherein: selecting the first patterns and generating the first illumination patterns result in pattern scanning an array of pixels to produce the first illumination patterns as a sequence of two-dimensional patterns of illumination pixels.

In some aspects, the techniques described herein relate to a method, further including: receiving the light energy through a non-imaging lens to produce non-imaged light energy, and wherein detecting the light energy includes detecting the non-imaged light energy using a single-photon avalanche diode (SPAD) array to produce an array of light detections in parallel, wherein constructing the histograms includes constructing the histograms in parallel from the array of the light detections.

In some aspects, the techniques described herein relate to a method, further including: combining the histograms into a cumulative histogram, wherein reconstructing includes reconstructing based on the cumulative histogram.

In some aspects, the techniques described herein relate to a method, wherein: selecting the second patterns includes selecting only a subset of the first patterns as the second patterns; and generating the second illumination patterns includes generating only the subset of the first illumination patterns as the second illumination patterns.

In some aspects, the techniques described herein relate to a method, wherein: the operational objective includes increasing a video frame rate of the first illumination patterns while maintaining a predetermined quality of the image; generating the first illumination patterns includes generating the first illumination patterns at a first video frame rate; and generating the second illumination patterns at a second video frame rate that is greater than the first video frame rate to achieve the operational objective.

In some aspects, the techniques described herein relate to a method, wherein: reconstructing the image includes determining a region-of-interest of the target; performing the feedback processing includes performing the feedback processing based on the region-of-interest as the operational objective; and responsive to the feedback, selecting the second patterns includes selecting only a subset of the first patterns that focus on the region-of-interest as the second patterns.

In some aspects, the techniques described herein relate to a method, further including: determining a measure of noise that reduces a quality of the image; performing the feedback processing includes performing the feedback processing to reduce the measure of the noise as the operational objective; and responsive to the feedback, selecting the second patterns includes selecting the second patterns to reduce the measure of the noise.

In some aspects, the techniques described herein relate to a method, further including: detecting the light energy includes determining total light energies produced by corresponding ones of the first illumination patterns; performing the feedback processing includes performing the feedback processing to maximize the total light energies; and responsive to the feedback, selecting the second patterns includes selecting, as the second patterns, only a subset of the first patterns that produced highest total light energies among the total light energies.

In some aspects, the techniques described herein relate to a method, wherein: reconstructing the image and the feedback processing includes using compressive sensing and machine learning techniques.

In some aspects, the techniques described herein relate to an apparatus including: a controller to perform selecting first patterns for illumination; an optical transmitter to perform generating first illumination patterns that are time-varying based on the first patterns, to illuminate a target; an optical receiver to detect light energy of the first illumination patterns reflected by the target; and wherein the controller is configured to perform: constructing histograms of the light energy that is detected; reconstructing an image of the target using the histograms and the first patterns; feedback processing of the image based on an operational objective, associated with one or more of generating illumination patterns or reconstructing the image, to produce feedback for selecting second patterns that differ from the first patterns and are configured to achieve the operational objective; and responsive to the feedback, selecting the second patterns; wherein the optical transmitter is configured to perform generating second illumination patterns based on the second patterns to illuminate the target.

In some aspects, the techniques described herein relate to an apparatus, wherein the controller, the optical transmitter, and the optical receiver are configured to perform: repeating detecting, reconstructing, and the feedback processing using the second illumination patterns.

In some aspects, the techniques described herein relate to an apparatus, wherein: the controller includes a codebook and the controller is configured to perform selecting the first patterns by selecting the first patterns from the codebook; and the optical transmitter includes an individually addressable light array (IALA), and the IALA is configured to perform modulating light responsive to the first patterns to produce the first illumination patterns.

In some aspects, the techniques described herein relate to an apparatus, wherein: the optical receiver includes: a non-imaging lens to diffuse the light energy to produce diffuse light energy; and a single-photon avalanche diode (SPAD) array to detect the diffuse light energy to produce an array of light detections; and the controller is configured to perform constructing the histograms by constructing the histograms from the array of the light detections.

In some aspects, the techniques described herein relate to an apparatus including: a controller to select patterns for illumination; an optical transmitter including an individually addressable laser array (IALA) to produce illumination patterns responsive to the patterns, to illuminate a target; and an optical receiver including: a non-imaging lens to receive light energy of the illumination patterns that is reflected by the target, to produce non-imaged light energy; and a single-photon avalanche diode (SPAD) array to detect the non-imaged light energy across the SPAD array, to produce an array of light detections; wherein the controller is configured to: construct histograms of the array of the light detections; and reconstruct an image of the target using the histograms and the patterns.

In some aspects, the techniques described herein relate to an apparatus, wherein the optical transmitter further includes a pixel shifter following the IALA to pixel-shift modulated light produced by the IALA, to produce the illumination patterns as pixel-shifted illumination patterns.

In some aspects, the techniques described herein relate to an apparatus, wherein the controller is further configured to: combine the histograms into a cumulative histogram, wherein the controller is configured to reconstruct the image using the cumulative histogram.

In some aspects, the techniques described herein relate to a non-transitory computer readable medium encoded with instructions that, when executed by a processor of a photon imaging system, cause the processor to perform: selecting first patterns for illumination, and generating first illumination patterns that are time-varying responsive to the first patterns in order to illuminate a target; detecting light energy of the first illumination patterns that is reflected by the target; constructing histograms of the light energy that is detected; reconstructing an image of the target using the histograms and the first patterns; performing feedback processing of the image based on an operational objective, associated with one or more of generating illumination patterns or reconstructing the image, to produce feedback for selecting second patterns that differ from the first patterns and are configured to achieve the operational objective; and responsive to the feedback, selecting the second patterns, and generating second illumination patterns based on the second patterns to illuminate the target.

In some aspects, the techniques described herein relate to a non-transitory computer readable medium, further comprising instructions to cause the processor to perform: after generating the second illumination patterns, repeating detecting, reconstructing, and performing the feedback processing using the second illumination patterns.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method performed by a photon imaging system comprising:
   selecting first patterns for illumination, and generating first illumination patterns that are time-varying responsive to the first patterns in order to illuminate a target;
   detecting light energy of the first illumination patterns that is reflected by the target;
   constructing histograms of the light energy that is detected;
   reconstructing an image of the target using the histograms and the first patterns;
   performing feedback processing of the image based on an operational objective, associated with one or more of generating illumination patterns or reconstructing the image, to produce feedback for selecting second patterns that differ from the first patterns and are configured to achieve the operational objective; and
   responsive to the feedback, selecting the second patterns, and generating second illumination patterns based on the second patterns to illuminate the target.

2. The method of claim 1, further comprising:
   after generating the second illumination patterns, repeating detecting, reconstructing, and performing the feedback processing using the second illumination patterns.

3. The method of claim 1, wherein:
   selecting the first patterns includes selecting the first patterns from a codebook; and
   generating the first illumination patterns includes, by an individually addressable light array (IALA), modulating light responsive to the first patterns to produce the first illumination patterns.

4. The method of claim 3, wherein:
   generating the first illumination patterns further includes pixel shifting modulated light produced by modulating to produce the first illumination patterns as pixel shifted illumination patterns that have a higher pixel resolution than without pixel shifting.

5. The method of claim 1, wherein:
   selecting the first patterns and generating the first illumination patterns result in pattern scanning an array of pixels to produce the first illumination patterns as a sequence of two-dimensional patterns of illumination pixels.

6. The method of claim 1, further comprising:
   receiving the light energy through a non-imaging lens to produce non-imaged light energy, and
   wherein detecting the light energy includes detecting the non-imaged light energy using a single-photon avalanche diode (SPAD) array to produce an array of light detections in parallel,
   wherein constructing the histograms includes constructing the histograms in parallel from the array of the light detections.

7. The method of claim 6, further comprising:
   combining the histograms into a cumulative histogram,
   wherein reconstructing includes reconstructing based on the cumulative histogram.

8. The method of claim 1, wherein:
   selecting the second patterns includes selecting only a subset of the first patterns as the second patterns; and
   generating the second illumination patterns includes generating only the subset of the first illumination patterns as the second illumination patterns.

9. The method of claim 8, wherein:
   the operational objective includes increasing a video frame rate of the first illumination patterns while maintaining a predetermined quality of the image;
   generating the first illumination patterns includes generating the first illumination patterns at a first video frame rate; and
   generating the second illumination patterns at a second video frame rate that is greater than the first video frame rate to achieve the operational objective.

10. The method of claim 1, wherein:
    reconstructing the image includes determining a region-of-interest of the target;
    performing the feedback processing includes performing the feedback processing based on the region-of-interest as the operational objective; and
    responsive to the feedback, selecting the second patterns includes selecting only a subset of the first patterns that focus on the region-of-interest as the second patterns.

11. The method of claim 1, further comprising:
    determining a measure of noise that reduces a quality of the image;
    performing the feedback processing includes performing the feedback processing to reduce the measure of the noise as the operational objective; and
    responsive to the feedback, selecting the second patterns includes selecting the second patterns to reduce the measure of the noise.

12. The method of claim 1, further comprising:
detecting the light energy includes determining total light energies produced by corresponding ones of the first illumination patterns;
performing the feedback processing includes performing the feedback processing to maximize the total light energies; and
responsive to the feedback, selecting the second patterns includes selecting, as the second patterns, only a subset of the first patterns that produced highest total light energies among the total light energies.

13. The method of claim 1, wherein:
reconstructing the image and the feedback processing includes using compressive sensing and machine learning techniques.

14. An apparatus comprising:
a controller to perform selecting first patterns for illumination;
an optical transmitter to perform generating first illumination patterns that are time-varying based on the first patterns, to illuminate a target;
an optical receiver to detect light energy of the first illumination patterns reflected by the target; and
wherein the controller is configured to perform:
constructing histograms of the light energy that is detected;
reconstructing an image of the target using the histograms and the first patterns;
feedback processing of the image based on an operational objective, associated with one or more of generating illumination patterns or reconstructing the image, to produce feedback for selecting second patterns that differ from the first patterns and are configured to achieve the operational objective; and
responsive to the feedback, selecting the second patterns;
wherein the optical transmitter is configured to perform generating second illumination patterns based on the second patterns to illuminate the target.

15. The apparatus of claim 14, wherein the controller, the optical transmitter, and the optical receiver are configured to perform:
repeating detecting, reconstructing, and the feedback processing using the second illumination patterns.

16. The apparatus of claim 14, wherein:
the controller includes a codebook and the controller is configured to perform selecting the first patterns by selecting the first patterns from the codebook; and
the optical transmitter includes an individually addressable light array (IALA), and the IALA is configured to perform modulating light responsive to the first patterns to produce the first illumination patterns.

17. The apparatus of claim 14, wherein:
the optical receiver includes:
a non-imaging lens to diffuse the light energy to produce diffuse light energy; and
a single-photon avalanche diode (SPAD) array to detect the diffuse light energy to produce an array of light detections; and
the controller is configured to perform constructing the histograms by constructing the histograms from the array of the light detections.

18. An apparatus comprising:
a controller to select patterns for illumination;
an optical transmitter including an individually addressable laser array (IALA) to produce illumination patterns responsive to the patterns, to illuminate a target; and
an optical receiver including:
a non-imaging lens to receive light energy of the illumination patterns that is reflected by the target, to produce non-imaged light energy; and
a single-photon avalanche diode (SPAD) array to detect the non-imaged light energy across the SPAD array, to produce an array of light detections;
wherein the controller is configured to:
construct histograms of the array of the light detections; and
reconstruct an image of the target using the histograms and the patterns.

19. The apparatus of claim 18, wherein the optical transmitter further includes a pixel shifter following the IALA to pixel-shift modulated light produced by the IALA, to produce the illumination patterns as pixel-shifted illumination patterns.

20. The apparatus of claim 19, wherein the controller is further configured to:
combine the histograms into a cumulative histogram,
wherein the controller is configured to reconstruct the image using the cumulative histogram.

* * * * *